US010541641B2

(12) United States Patent
Tomolillo

(10) Patent No.: US 10,541,641 B2
(45) Date of Patent: Jan. 21, 2020

(54) SOLAR PANEL MOUNT SYSTEMS AND METHODS

(71) Applicant: Solar Slate Solutions, Billerica, MA (US)

(72) Inventor: David Tomolillo, Billerica, MA (US)

(73) Assignee: Solar Slate Solutions, Billerica, MA (US)

( * ) Notice: Subject to any disclaimer, the term of this patent is extended or adjusted under 35 U.S.C. 154(b) by 0 days.

(21) Appl. No.: 15/797,603

(22) Filed: Oct. 30, 2017

(65) Prior Publication Data

US 2019/0131916 A1    May 2, 2019

(51) Int. Cl.
*H02S 20/23* (2014.01)
*F24S 25/60* (2018.01)

(52) U.S. Cl.
CPC .............. *H02S 20/23* (2014.12); *F24S 25/60* (2018.05)

(58) Field of Classification Search
CPC .................................. H02S 20/23; F24S 25/60
USPC ........................................................ 52/173.3
See application file for complete search history.

(56) References Cited

U.S. PATENT DOCUMENTS

| 464,503 A | 12/1891 | Jackson |
| 625,509 A | 5/1899 | Jackson |
| 1,202,729 A * | 10/1916 | Nilsson ..................... E04D 1/34 52/543 |
| 1,583,163 A | 5/1926 | Munro |
| 2,084,981 A | 6/1937 | Anderson |
| 2,135,811 A | 11/1938 | Goslin |
| 2,187,404 A | 1/1940 | Simons et al. |
| 3,373,534 A | 3/1968 | Berrige |
| 3,848,383 A | 11/1974 | Wilson et al. |
| 4,001,997 A | 1/1977 | Saltzman |
| 4,295,314 A | 10/1981 | Ferguson |
| 4,599,828 A | 7/1986 | Ishikura |
| 4,920,713 A | 5/1990 | Borresen et al. |
| 4,982,923 A | 1/1991 | Wanner |
| 5,232,518 A * | 8/1993 | Nath ..................... E04D 3/3605 136/251 |
| 5,711,126 A | 1/1998 | Wells |

(Continued)

FOREIGN PATENT DOCUMENTS

| FR | 2934620 A3 * | 2/2010 | ............... E04D 1/16 |
| JP | 3084003 B2 | 1/1999 | |

(Continued)

OTHER PUBLICATIONS

Non-Final Office Action for U.S. Appl. No. 14/658,956 dated Mar. 9, 2016. (8 pages).

(Continued)

*Primary Examiner* — Patrick J Maestri
*Assistant Examiner* — Joseph J. Sadlon
(74) *Attorney, Agent, or Firm* — Foley & Lardner LLP

(57) ABSTRACT

A solar panel mount includes a plate, a plurality of flanges, and a mounting member. The plate includes a first edge and a first surface. The plate defines at least one opening spaced from the first edge. The plurality of flanges extend from the first edge in a direction transverse to the first surface. The mounting member defines at least one channel aligned with the at least one opening of the plate to receive a mounting shaft through an opening of the at least one opening and a corresponding channel of the at least one channel.

15 Claims, 18 Drawing Sheets

(56) References Cited

U.S. PATENT DOCUMENTS

| | | | | |
|---|---|---|---|---|
| 5,846,018 | A | 12/1998 | Frobosilo et al. | |
| 5,897,086 | A | 4/1999 | Condon | |
| 5,946,877 | A | 9/1999 | Gallinat et al. | |
| 6,052,961 | A | 4/2000 | Gibbs | |
| 6,105,331 | A | 8/2000 | Rinklake et al. | |
| 6,311,436 | B1 * | 11/2001 | Mimura | E04D 1/365 52/173.3 |
| 6,360,497 | B1 * | 3/2002 | Nakazima | E04D 1/24 126/622 |
| 6,526,701 | B2 | 3/2003 | Stearns et al. | |
| 6,584,737 | B1 * | 7/2003 | Bradley, Jr. | F24J 2/5247 248/148 |
| 6,629,391 | B1 | 10/2003 | Børresen et al. | |
| 7,163,083 | B2 | 1/2007 | Argoud | |
| 7,178,301 | B2 | 2/2007 | Albright | |
| 7,225,590 | B1 | 6/2007 | Digirolamo et al. | |
| 7,441,383 | B2 | 10/2008 | O'Neal | |
| 7,465,873 | B2 * | 12/2008 | Nomura | H02S 20/23 136/244 |
| 7,520,098 | B1 | 4/2009 | Martinique et al. | |
| D608,916 | S | 1/2010 | Simmons | |
| 7,745,722 | B2 | 6/2010 | Warfield et al. | |
| 7,762,027 | B1 * | 7/2010 | Wentworth | F24S 25/61 52/173.3 |
| 7,845,141 | B2 | 12/2010 | Martinique | |
| 8,006,456 | B1 | 8/2011 | Green et al. | |
| 8,082,716 | B1 | 12/2011 | Worley et al. | |
| 8,122,648 | B1 | 2/2012 | Liu | |
| 8,136,311 | B2 | 3/2012 | Liu | |
| 8,136,322 | B2 | 3/2012 | Shadwell et al. | |
| 8,153,700 | B2 | 4/2012 | Stearns et al. | |
| 8,166,713 | B2 | 5/2012 | Stearns et al. | |
| 8,181,398 | B2 | 5/2012 | Stearns et al. | |
| 8,209,914 | B2 | 7/2012 | Stearns et al. | |
| 8,225,557 | B2 | 7/2012 | Stearns et al. | |
| 8,245,454 | B2 | 8/2012 | Stearns et al. | |
| 8,245,460 | B2 | 8/2012 | Yamanaka et al. | |
| 8,272,174 | B2 | 9/2012 | Stearns et al. | |
| 8,413,388 | B2 | 4/2013 | Stearns et al. | |
| 8,424,821 | B2 | 4/2013 | Liu | |
| 8,539,719 | B2 * | 9/2013 | McPheeters | E04D 13/1476 52/27 |
| 8,713,858 | B1 | 5/2014 | Xie | |
| 8,752,338 | B2 | 6/2014 | Schaefer et al. | |
| 8,756,881 | B2 * | 6/2014 | West | E04B 1/38 52/173.3 |
| 8,806,815 | B1 | 8/2014 | Liu et al. | |
| 8,826,618 | B2 | 9/2014 | Stearns | |
| 8,839,575 | B1 | 9/2014 | Liu et al. | |
| 8,857,108 | B2 | 10/2014 | Smeja | |
| 8,869,470 | B2 * | 10/2014 | Lanza | E04D 1/30 52/173.3 |
| 8,869,490 | B2 * | 10/2014 | Schaefer | A47B 96/14 52/710 |
| 8,935,893 | B2 | 1/2015 | Liu et al. | |
| 8,950,157 | B1 * | 2/2015 | Schrock | H02S 20/00 52/745.06 |
| 9,010,038 | B1 | 4/2015 | Stearns et al. | |
| 9,068,764 | B2 * | 6/2015 | Moore | E04D 3/366 |
| 9,153,950 | B2 * | 10/2015 | Yamanaka | H01L 31/05 |
| 9,181,705 | B2 | 11/2015 | Lanza | |
| 9,194,130 | B1 | 11/2015 | Stanley | |
| 9,212,833 | B2 | 12/2015 | Stearns et al. | |
| 9,303,410 | B2 | 4/2016 | Steffes et al. | |
| 9,322,173 | B2 | 4/2016 | Pisani | |
| 9,394,693 | B2 * | 7/2016 | Daniels | E04D 13/17 |
| 9,416,540 | B2 | 8/2016 | Allen et al. | |
| 9,422,721 | B2 | 8/2016 | Stearns et al. | |
| 9,422,723 | B2 | 8/2016 | Stearns et al. | |
| 9,431,953 | B2 | 8/2016 | Stearns et al. | |
| 9,434,044 | B2 | 9/2016 | Kosuge et al. | |
| 9,447,988 | B2 | 9/2016 | Stearns et al. | |
| 9,774,292 | B2 | 9/2017 | Stearns et al. | |
| 10,270,382 | B2 * | 4/2019 | Vignal | E04D 3/30 |
| 10,277,159 | B2 * | 4/2019 | Poivet | H02S 20/23 |
| 2001/0025458 | A1 | 10/2001 | James et al. | |
| 2006/0053734 | A1 | 3/2006 | Anderson | |
| 2007/0079865 | A1 | 4/2007 | Warfield et al. | |
| 2007/0245636 | A1 | 10/2007 | Ayer et al. | |
| 2010/0088996 | A1 | 4/2010 | Thompson et al. | |
| 2010/0236155 | A1 | 9/2010 | Lanza | |
| 2010/0307074 | A1 | 12/2010 | Stearns et al. | |
| 2011/0120047 | A1 | 5/2011 | Stearns et al. | |
| 2011/0232222 | A1 | 9/2011 | McPheeters et al. | |
| 2011/0297808 | A1 | 12/2011 | Yamanaka et al. | |
| 2012/0005978 | A1 | 1/2012 | Jenkins et al. | |
| 2012/0023835 | A1 | 2/2012 | Stearns et al. | |
| 2012/0023836 | A1 | 2/2012 | Stearns et al. | |
| 2012/0023843 | A1 | 2/2012 | Stearns et al. | |
| 2012/0049022 | A1 | 3/2012 | Coyle | |
| 2012/0079774 | A1 | 4/2012 | Stearns et al. | |
| 2012/0291389 | A1 | 11/2012 | Jenkins et al. | |
| 2012/0304559 | A1 | 12/2012 | Ishida | |
| 2014/0013677 | A1 | 1/2014 | McPheeters et al. | |
| 2014/0223838 | A1 | 8/2014 | West et al. | |
| 2014/0339387 | A1 | 11/2014 | Bolze et al. | |
| 2015/0270802 | A1 | 9/2015 | Schaefer et al. | |
| 2016/0040431 | A1 | 2/2016 | Stanley | |
| 2016/0343892 | A1 * | 11/2016 | Hsieh | H02S 40/42 |
| 2017/0207743 | A1 | 7/2017 | Lemos et al. | |
| 2017/0237930 | A1 | 8/2017 | Kim et al. | |
| 2017/0338767 | A1 * | 11/2017 | Shevlin | H02S 20/23 |

FOREIGN PATENT DOCUMENTS

| | | | |
|---|---|---|---|
| JP | 3773935 | B2 | 1/2004 |
| JP | 4400875 | B2 | 2/2006 |
| JP | 2015-055042 | A | 3/2015 |
| WO | WO-2013/124613 | | 8/2013 |

OTHER PUBLICATIONS

Non-Final Office Action for U.S. Appl. No. 15/261,221 dated Oct. 4, 2016. (12 pages).

* cited by examiner

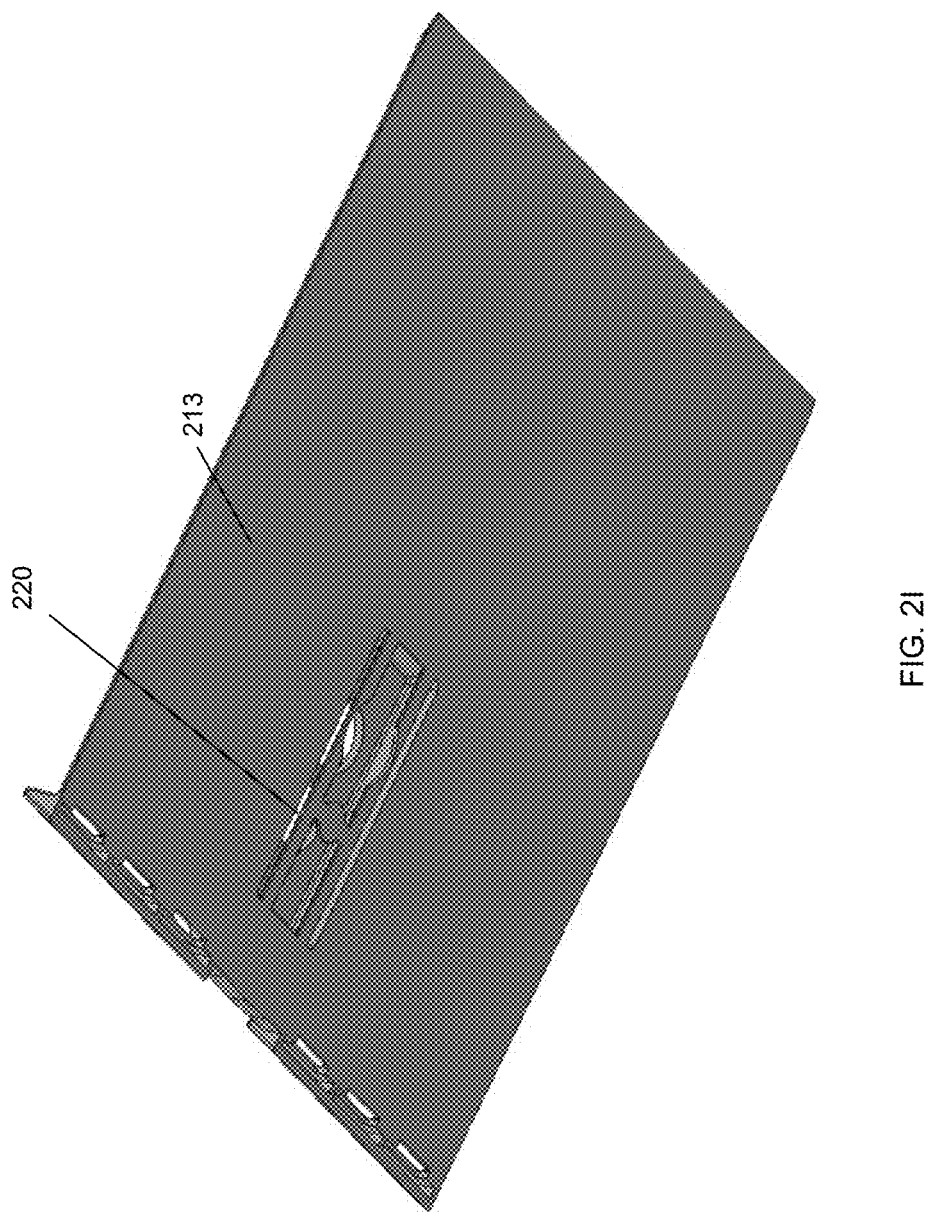

SOLAR PANEL MOUNT SYSTEMS AND METHODS

TECHNICAL FIELD

The present application relates generally to mounts, such as roof mounts and panel mounts. In particular, the present application relates to a solar panel mount for mounting a solar panel on a roof, such as a slate roof constructed from a plurality of slate tiles.

BACKGROUND

Solar energy is an increasingly popular source of electrical energy. Solar energy is typically harvested through the use of solar panels. These solar panels may be mounted on rooftops, such as on the roof of a residential home or commercial building. These rooftops are often covered in shingles or other similar roofing material. Accordingly, the solar panels must be mounted to these roofs in such a way as to not disturb the roofing material.

Particular problems arise when the roofing material includes a plurality of tiles or shingles, such as slate tiles, which must first be removed such that the solar panel can be secured directly to the roof, rather than through the tiles. Replacing the plurality of tiles once the solar panel has been secured to the roof is a difficult and arduous process, and significantly increases costs associated with mounting solar panels to roofs with slate tiles.

SUMMARY

According to an embodiment of the present disclosure, a solar panel mount includes a plate, a plurality of flanges, and a mounting member. The plate includes a first edge and a first surface. The plate defines at least one opening spaced from the first edge. The plurality of flanges extend from the first edge in a direction transverse to the first surface. The mounting member defines at least one channel aligned with the at least one opening of the plate to receive a mounting shaft through an opening of the at least one opening and a corresponding channel of the at least one channel.

According to another embodiment of the present disclosure, a mounting member for a solar panel mount assembly includes a body. The body include a first surface and a second surface spaced from the first surface. The body defines two channels extending through the body from the first surface to the second surface. A first channel of the two channels increases in radius from the first surface to the second surface. A second channel of the two channels decreases in radius from the first surface to the second surface.

According to another embodiment, a roof mounting assembly includes a plate, a plurality of flanges, and a mounting member. The plate includes a first edge and a first surface. The plate defines at least one opening spaced from the first edge and from the first surface. The plate defines a cavity on an opposite side of the first surface from the at least one opening. The plurality of flanges extend from the first edge in a direction transverse to the first surface. The mounting member defines at least one channel sized to be aligned with the at least one opening of the plate when the mounting member is received in the cavity.

It is to be understood that both the foregoing general description and the following detailed description are exemplary and explanatory only and are not restrictive of the invention as claimed.

BRIEF DESCRIPTION OF THE DRAWINGS

FIG. 2I is a bottom perspective view of the mount subassembly shown in FIG. 2A;

DETAILED DESCRIPTION

Before turning to the accompanying drawing figures, which illustrate various non-exclusive exemplary embodiments in detail, it should be understood that the present application is not limited to the details or methodology set forth in the description or illustrated in the accompanying drawing figures. It should also be understood that the terminology used herein is for the purpose of description only and should not be regarded as limiting.

Referring to the figures generally, in some embodiments, a roof mounting assembly includes a plate, a plurality of flanges, and a mounting member. The plate includes a first edge and a first surface. The plate defines at least one opening spaced from the first edge and from the first surface. The plate defines a cavity on an opposite side of the first surface from the at least one opening. The plurality of flanges extend from the first edge in a direction transverse to the first surface. The mounting member defines at least one channel sized to be aligned with the at least one opening of the plate when the mounting member is received in the cavity.

Existing roof mounting assemblies for solar panels, such as for mounting solar panels to slate tile roofs, can require significant deconstruction of the slate tile roof. For example, some systems may require four tiles to be removed, such as in a square- or diamond-shaped pattern, in order to secure the roof mounting assembly to the roof. Such roof modification can be cosmetically and structurally undesirable. Systems in accordance with the present disclosure can improve upon existing roof mounting assemblies by requiring fewer tiles to be removed; for example, in some embodiments, only one tile can be removed. In addition, systems in accordance with the present disclosure can improve upon existing roof mounting assemblies by more effectively integrating with the existing roof structure, such as by providing water drainage pathways which fit with the existing roof structure. In various such embodiments, systems in accordance with the present disclosure can facilitate more efficient and less expensive installation than is possible through current mechanisms for mounting a solar panel to a roof. The solar panel mount 100 can provide a low profile, aesthetically desirable solution for mounting a solar panel to a roof by matching the existing roof tile shape, appearance and/or texture, while integrating into the existing drainage system of the roof.

Figure 1:
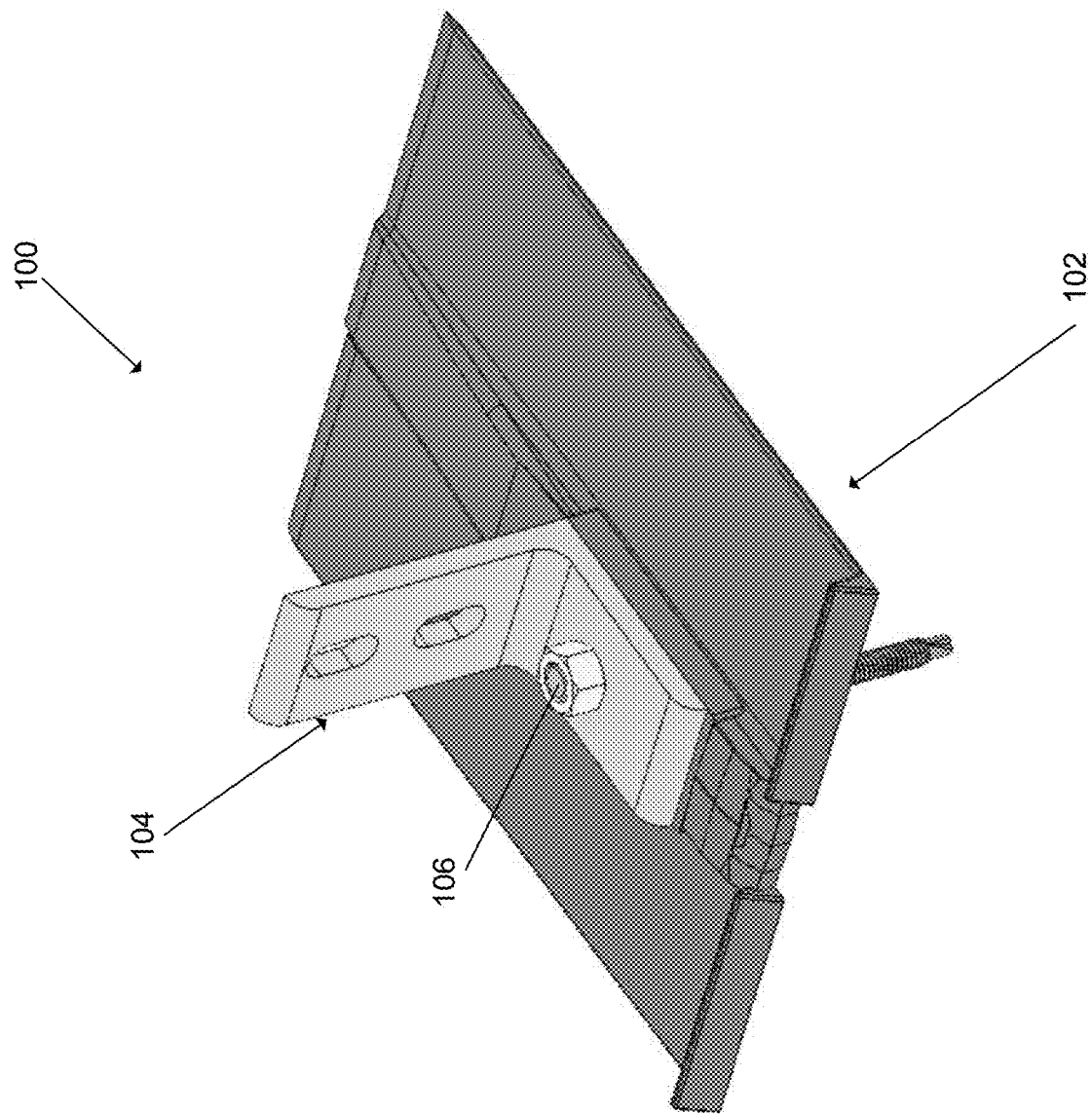
FIG. 1 is a top perspective view of a solar panel mount, according to an exemplary embodiment.

Referring now to FIG. 1, a solar panel mount 100 is shown. The solar panel mount 100 can be a coupler or part of a mounting system. The solar panel mount 100 can be coupled (e.g., fastened, secured) to a building, such as a residence, home, commercial building, warehouse, or other structure. The solar panel mount 100 can be coupled to a roof substrate or other exterior surface of the building, and be coupled to a solar panel or a structure supporting a solar panel. In this way, the solar panel mount 100 couples the solar panel to the roof. The roof includes roof tiles which may be, for example, a plurality of slate tiles, and a surface upon which the roof tiles are laid. The solar panel mount 100 interfaces with the roof tiles when the solar panel mount 100 is coupled to the roof. As will be explained in more detail herein, at least a portion of the solar panel mount 100 can be positioned between the roof substrate and the roof tile when the solar panel mount 100 is coupled to the roof substrate.

The solar panel mount 100 includes a plate 102. The plate 102 can interface directly with both the surface of the roof tiles and the roof substrate, such that the plate 102 is positioned between the roof tile and the roof substrate. The solar panel mount 100 also includes a second member, shown as a solar panel mounting bracket 104. The solar panel mounting bracket 104 can be coupled to the plate 102, and facilitates coupling of a solar panel to the solar panel mount 100. The solar panel mounting bracket 104 is coupled to the plate 102 via a fastener 106. In some embodiments, the fastener is a screw, bolt, threaded fastener, rivet, or spot weld. The fastener 106 extends through the plate 102 and into the roof substrate. Solar panel mount 100 is intended for retrofit installation, but may be installed when roof tiles are first laid down.

The plate 102, the solar panel mounting bracket 104, and the mounting member will now be described in further detail. Referring now to FIGS. 2A-2I, the solar panel mount 100 is shown with the solar panel mounting bracket 104 hidden. The solar panel mount 100 is shown to further include a mounting member 200. The mounting member 200 is received in the plate 102, and cooperates with the plate 102 and the solar panel mounting bracket 104 to couple the solar panel mount 100 to the roof substrate. In some embodiments, the plate 102 is overmolded onto the mounting member 200.

The plate 102 may be generally square or rectangular in shape, and includes a first edge 202. The first edge 202 may be an end face of the plate 102. When the solar panel mount 100 is coupled to a roof substrate, a lowest point (e.g., relative to a ground surface upon which the roof is supported) of the solar panel mount 100 is located along the first edge 202. The plate 102 also includes a second edge 204, which may be an end face of the plate 102. In contrast to the first edge 202, a highest point (e.g., relative to a ground surface upon which the roof is supported) of the solar panel mount 100 is located along the second edge 204 when the solar panel mount 100 is coupled to a roof. The first edge 202 is generally parallel to the second edge 204, in some embodiments. The plate 102 may be made of a plastic, such as a mineral filled polypropylene, which can facilitate manufacturing by facilitating mold filling. The plastic plate 102 can improve operation of the solar panel mount 100 by allowing the solar panel mount 100 to undergo shape changes in response to temperature changes over time, such as to avoid undesired deformations under load such as cracking, becoming brittle, or applying excessive stresses to the roof substrate. The plate 102 may be made of a UV stabilized plastic, which can improve longevity of the plate 102 under extensive sun exposure. The plate 102 may include flame retardant additives. In some embodiments, the plate 102 may be made of a thin sheet metal, such as steel or aluminum. The plate 102 may be coated or painted.

The plate 102 also includes a third edge 206 and a fourth edge 208. The third edge 206 is contiguous with both the first edge 202 and the second edge 204. Similarly, the fourth edge 208 is contiguous with both the first edge 202 and the second edge 204. In some embodiments, the third edge 206 is generally parallel to the fourth edge 208, and both the third edge 206 and the fourth edge 208 are generally orthogonal to the first edge 202 and the second edge 204. In some embodiments, at least one of the first edge 202 or the second edge 204 has a length 205 less than a threshold length corresponding to a width dimension of one or more roof tiles. In some embodiments, the threshold length is 6.7 inches. In some embodiments, the threshold length is less than 8 inches. In some embodiments, the threshold length is less than 10 inches. In further embodiments, the threshold length is greater than 3 inches and less than 9 inches. In some embodiments, at least one of the third edge 206 or the fourth edge 208 has a length 207 less than a threshold length corresponding to a length of a roof tile. In some embodiments, the threshold length is 7.7 inches. In some embodiments, the threshold length is less than 8 inches. In some embodiments, the threshold length is less than 10 inches. In further embodiments, the threshold length is greater than 4 inches and less than 10 inches. In some embodiments, the length 207 of the third edge 206 and/or the fourth edge 208 is similar to that of a roof tile of the roof to which the plate 102 is to be mounted.

The plate 102 further includes a divider 210 that extends across the plate 102. The divider 210 is a ridge or channel, in some embodiments. The divider 210 segments the plate 102 and separates adjacent portions of the first edge 202 and separates adjacent portions of the second edge 204. For example, the divider 210 can bisect the plate 102. The divider 210 also separates a first portion 212 of the plate 102 from second portion 214 of the plate 102. The portions 212, 214 may be faces of the plate 102. The divider 210 extends above the first portion 212 and the second portion 214, relative to a frame of reference in which the plate is mounted to the roof. In various embodiments, the divider 210 can be shaped such that the first portion 212 is the same shape, size, and configuration of the second portion 214. For example, the first portion 212 may be coplanar with the second portion 214. At least one of the divider 210, the first portion 212, or the second portion 214 can define a first surface 211 of the plate 102. The plate 102 includes a second surface 213 opposite the first surface 211.

In use, the plate 102 is coupled to a roof substrate, and a first roof tile is placed over the first portion 212 and a second roof tile is placed over the second portion 214. For example, the first roof tile may be placed over the first portion 212 such that the first roof tile abuts or otherwise contacts the divider 210, and the second roof tile may be placed over the second portion 214 such that the second roof tile abuts the divider 210. In an exemplary embodiment, the divider 210 separates the first roof tile from the second roof tile when the roof tiles are placed on the plate 102.

In some embodiments, at least one of the third edge 206 or the fourth edge 208 has a thickness 209 less than a threshold thickness for sliding the at least one of the third edge 206 or the fourth edge 208 between a roof tile and the roof substrate. For example, the first portion 212 and/or second portion 214 may be slid under an adjacent roof tile, enabling the solar panel mount 100 to be installed while only a single roof tile is removed. The threshold thickness may be 0.06 inches. In some embodiments, the threshold thickness is greater than 0.02 inches and less than 0.2 inches. In further embodiments, the threshold thickness is greater than 0.04 inches and less than 0.1 inches.

Figure 2A:
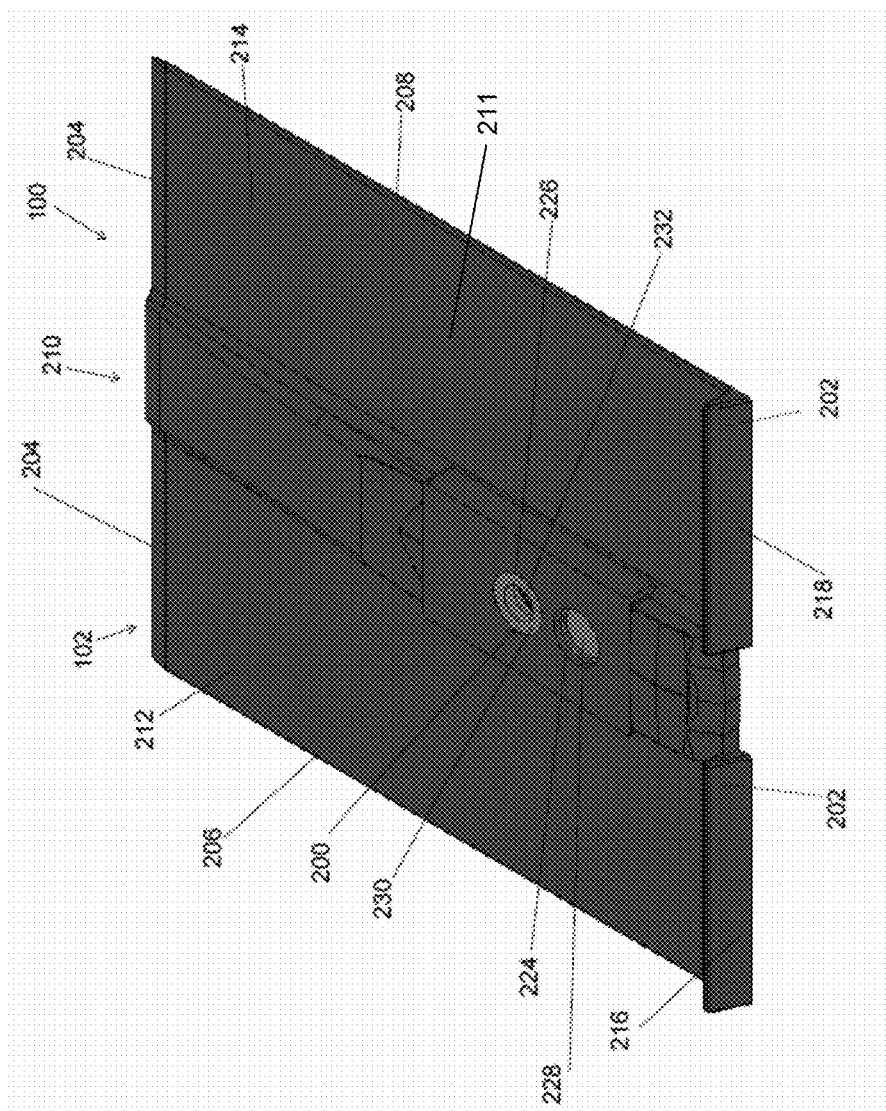
FIG. 2A is a top perspective view of a mount subassembly, according to an exemplary embodiment.
Figure 2B:
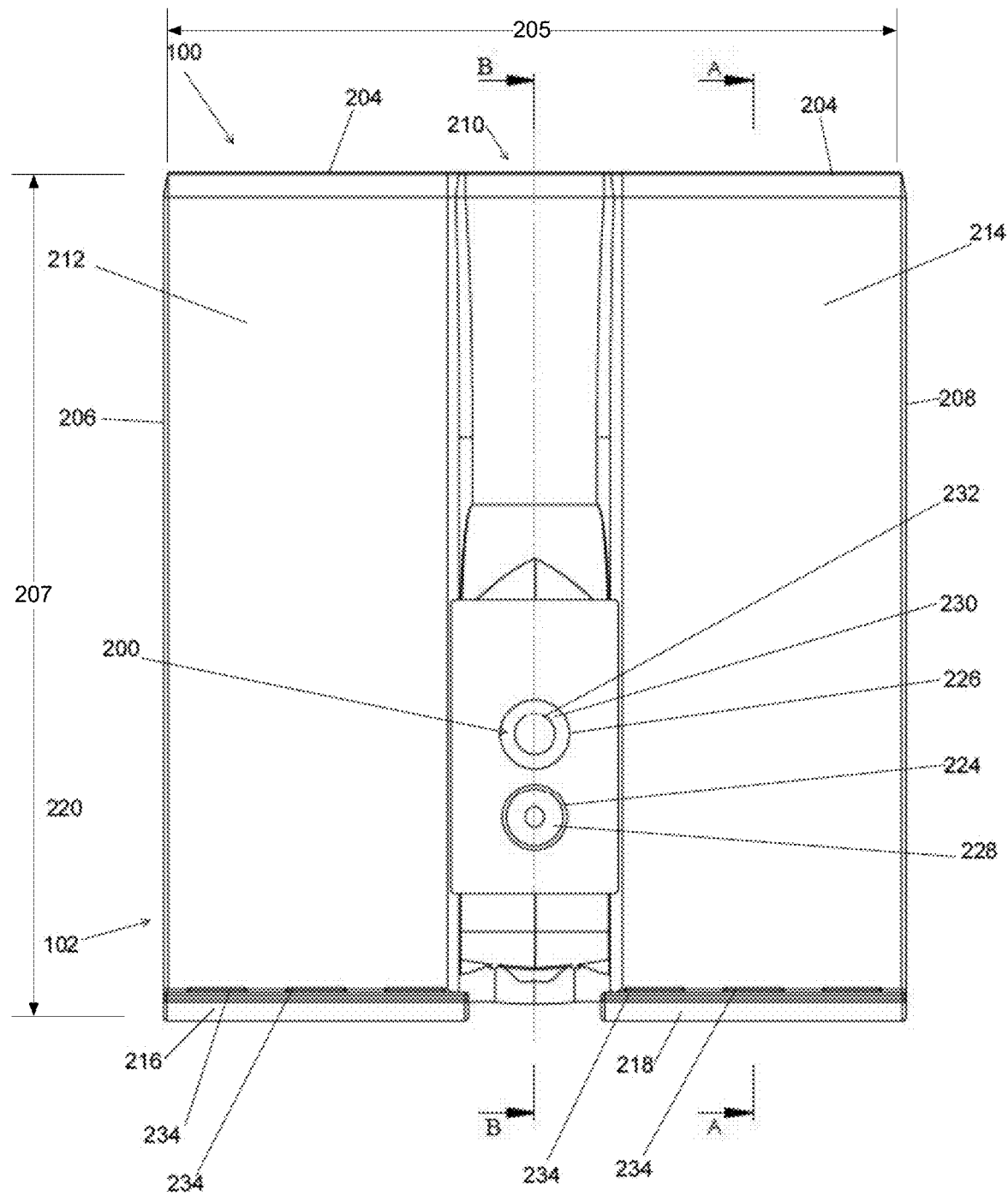
FIG. 2B is a top view of the mount subassembly shown in FIG. 2A.
Figure 2C:
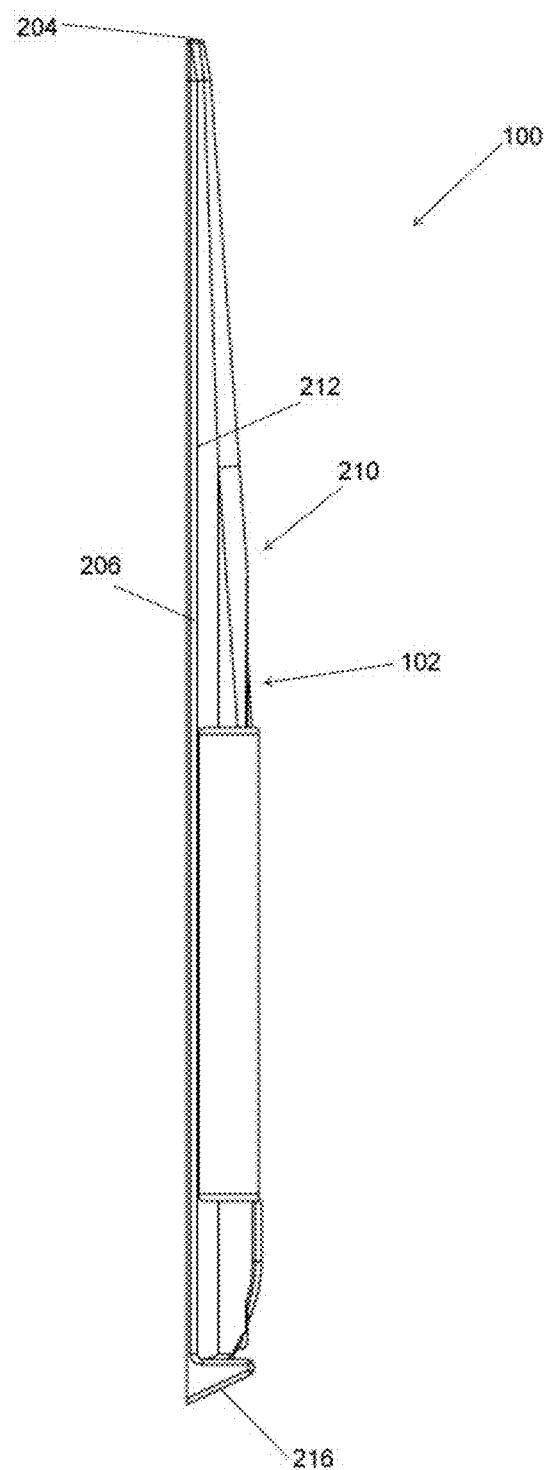
FIG. 2C is a left side view of the mount subassembly shown in FIG. 2A.

The plate 102 can include a plurality of flanges (e.g., protrusion, extension, protuberance, etc.) extending from the first edge 202. The flanges may be protrusions, extensions, or protuberances. For example, as shown in FIG. 2A, the plate 102 includes a first flange 216 and a second flange 218. The first flange 216 extends from the first portion 212 along the first edge 202. Similarly, the second flange 218 extends from the second portion 214 along the first edge 202. In an embodiment, the first flange 216 extends in a direction transverse to the first portion 212 and the second flange 218 extends in a direction transverse to the second portion 214. The first flange 216 and the second flange 218 facilitate retention of roof tiles relative to the plate 102. For example, a first roof tile may be placed over the first portion 212 such that the first roof tile abuts the divider 210 and the first flange 216, and a second roof tile may be placed over the second portion 214 such that the second roof tile abuts the divider 210 and the second flange 218. In some embodiments, such as shown in FIG. 2F, the flanges (e.g., second flange 218) define a flange surface 219 which forms a flange angle α relative to second portion 214 (or first portion 212 for first flange 216). The flange angle α may be sized to allow the solar panel mount 100 to fit in with adjacent roof tiles with a relatively low profile. In some embodiments, the flange angle α is 65 degrees. In some embodiments, the flange angle α greater than 40 degrees and less than 80 degrees. In further embodiments, the flange angle α is greater than 50 degrees and less than 70 degrees.

Figure 2D:
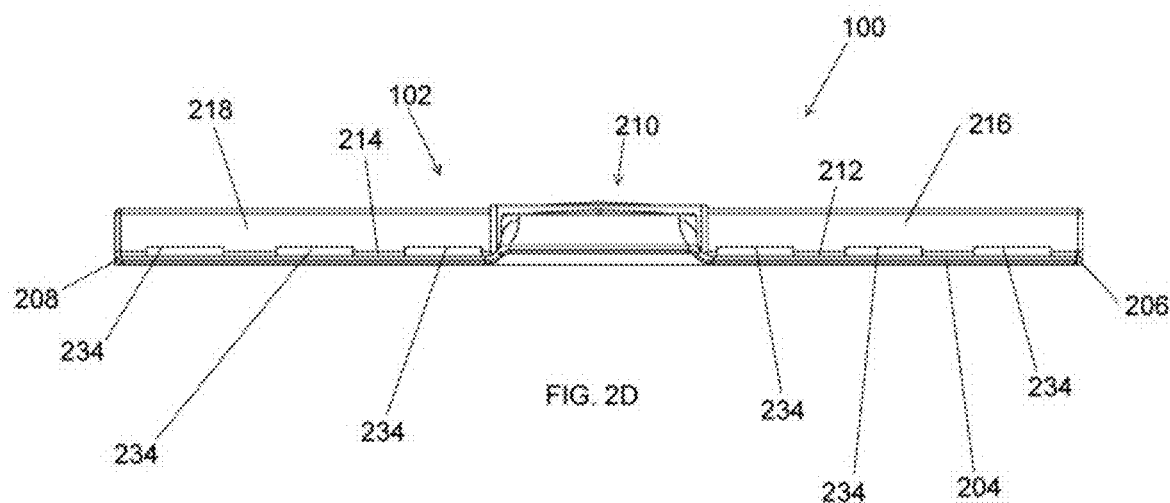
FIG. 2D is a rear side view of the mount subassembly shown in FIG. 2A.
Figure 2E:
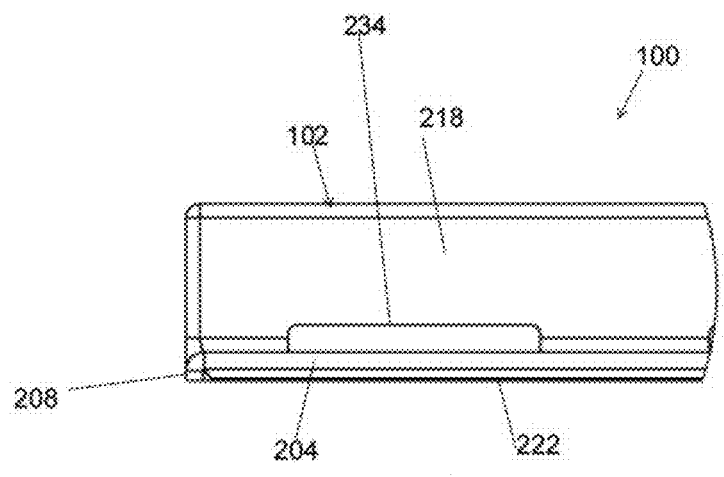
FIG. 2E is a detailed view of the rear side view of the mount subassembly shown in FIG. 2D.
Figure 2F:
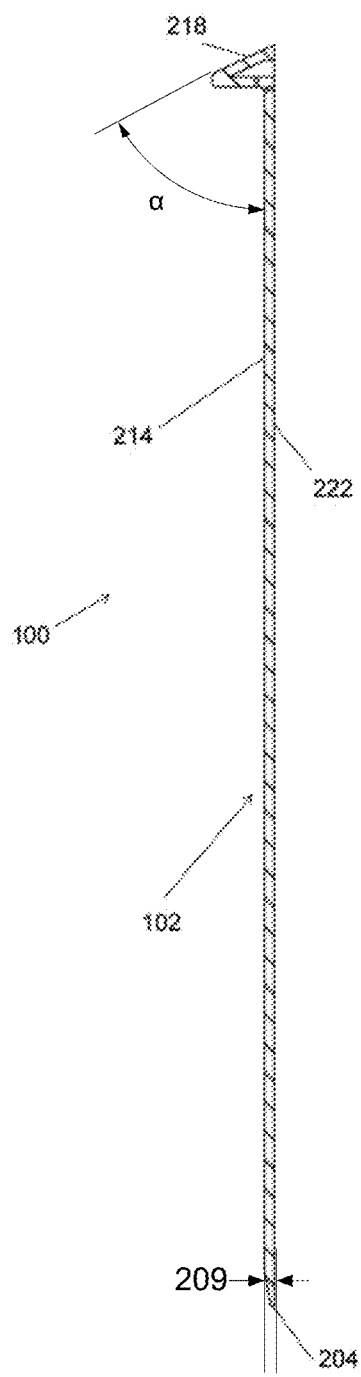
FIG. 2F is a cross-sectional view of the mount subassembly shown in FIG. 2B, taken about line A-A.
Figure 2G:
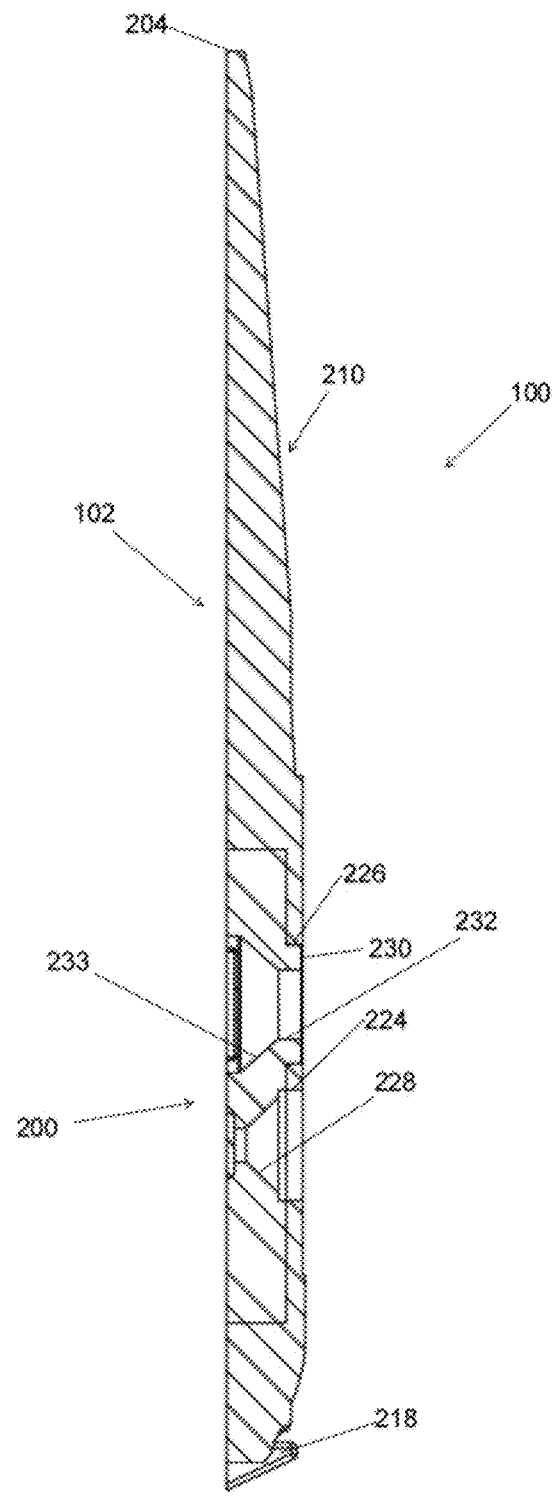
FIG. 2G is a cross-sectional view of the mount subassembly shown in FIG. 2B, taken about line B-B.
Figure 2H:
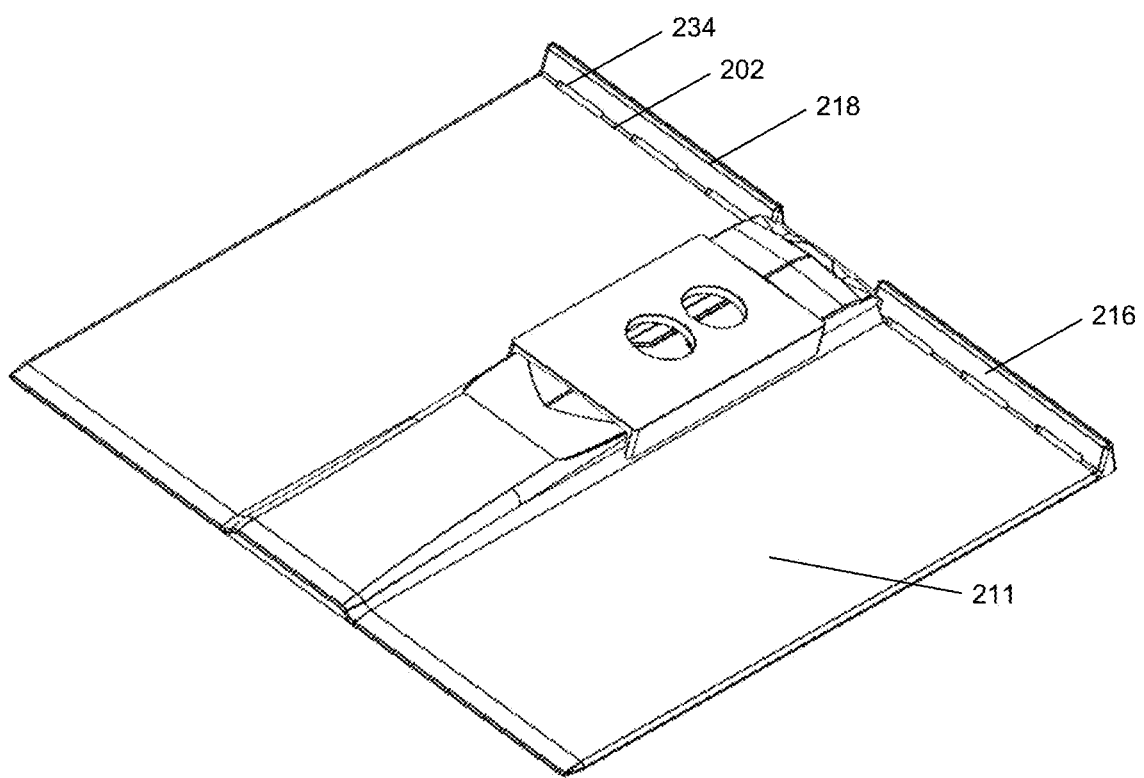
FIG. 2H is a rear perspective view of the mount subassembly shown in FIG. 2A.
Figure 3A:
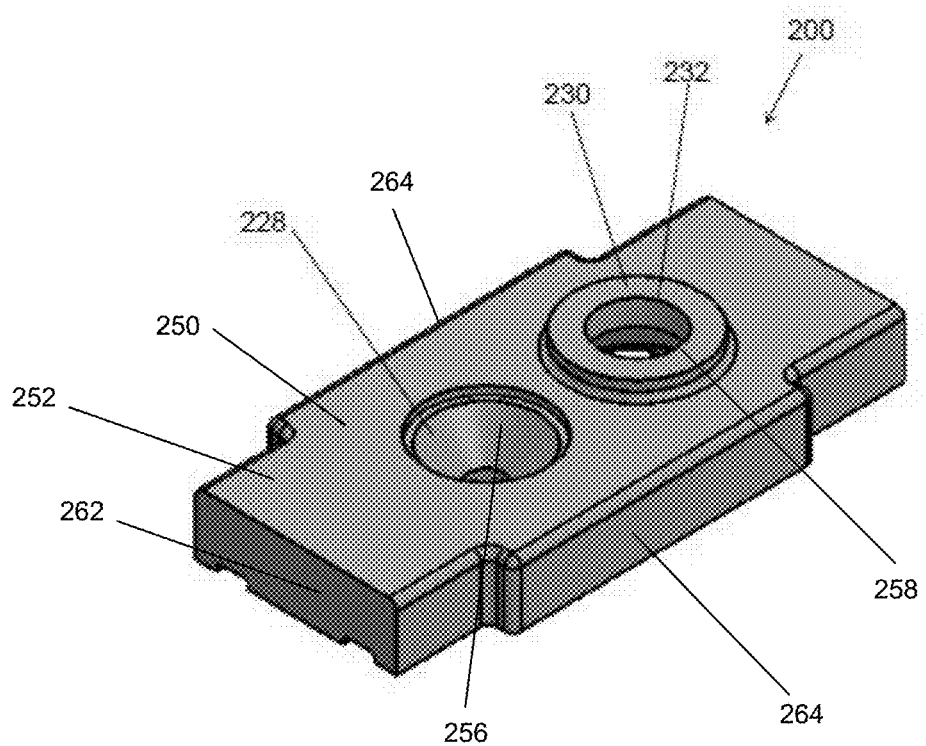
FIG. 3A is a top perspective view of a mounting member for use in a solar panel mount, such as the solar panel mount shown in FIG. 1, according to an exemplary embodiment.
Figure 3B:
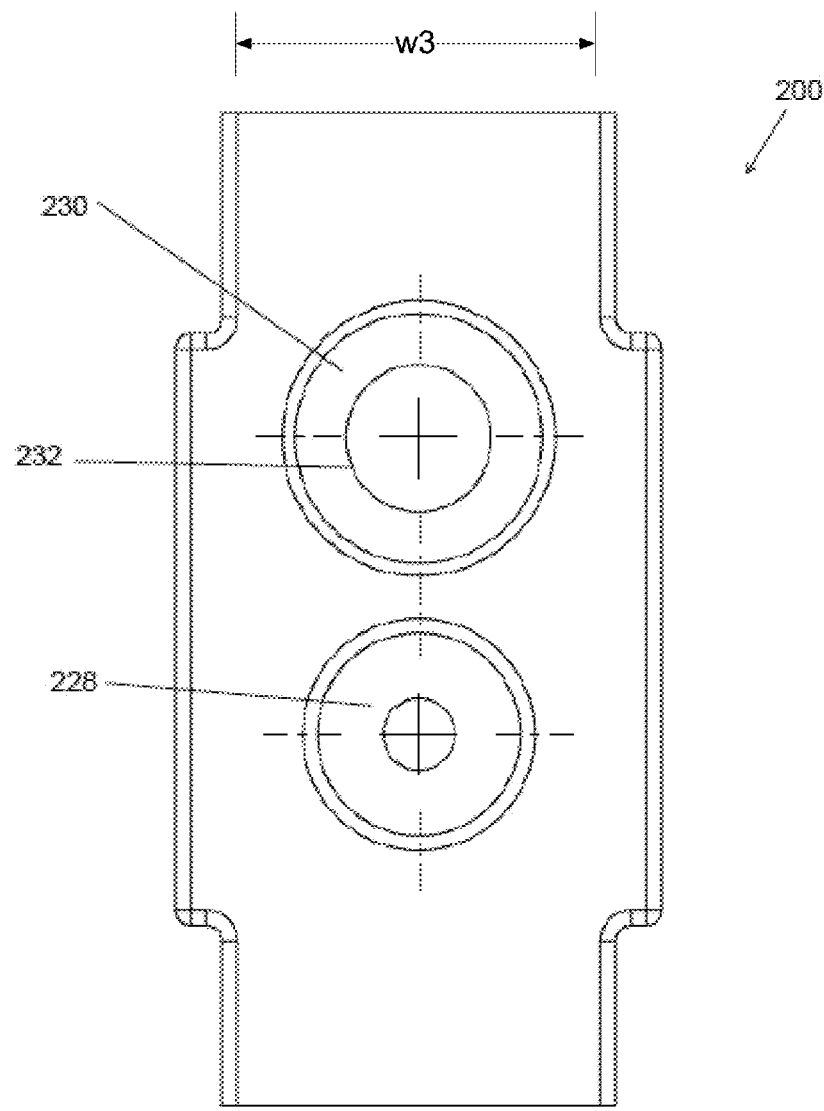
FIG. 3B is a top view of the mounting member shown in FIG. 3A.
Figure 3C:
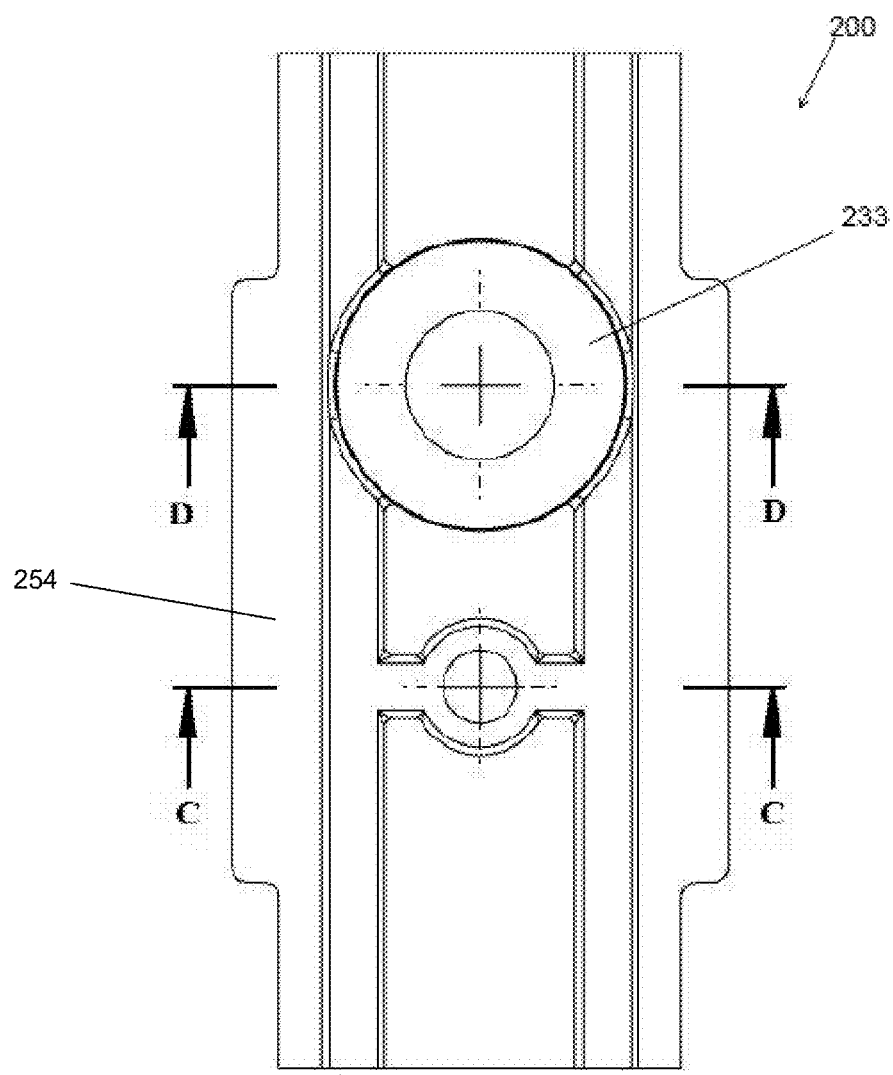
FIG. 3C is a bottom view of the mounting member shown in FIG. 3A.
Figure 3D:
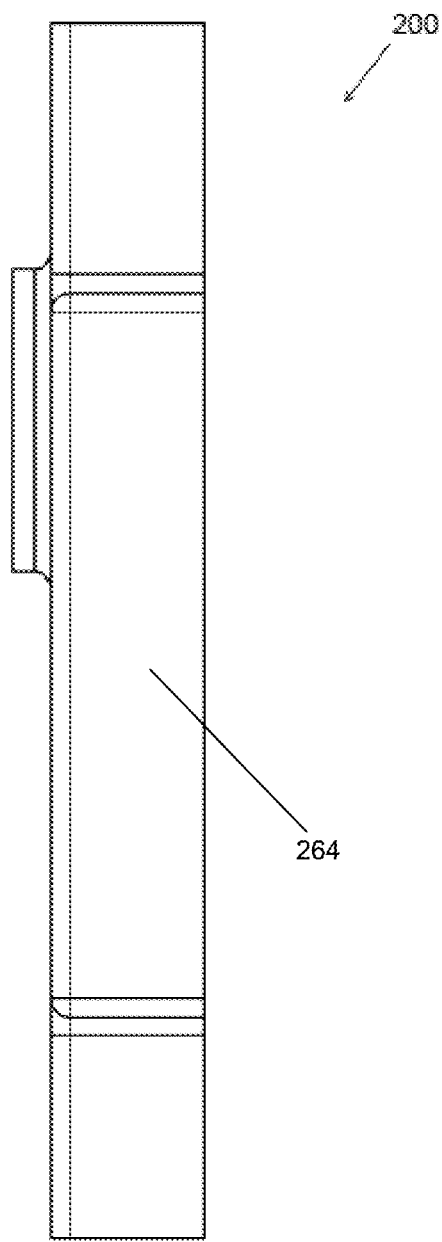
FIG. 3D is a right side view of the mounting member shown in FIG. 3A.
Figure 3E:
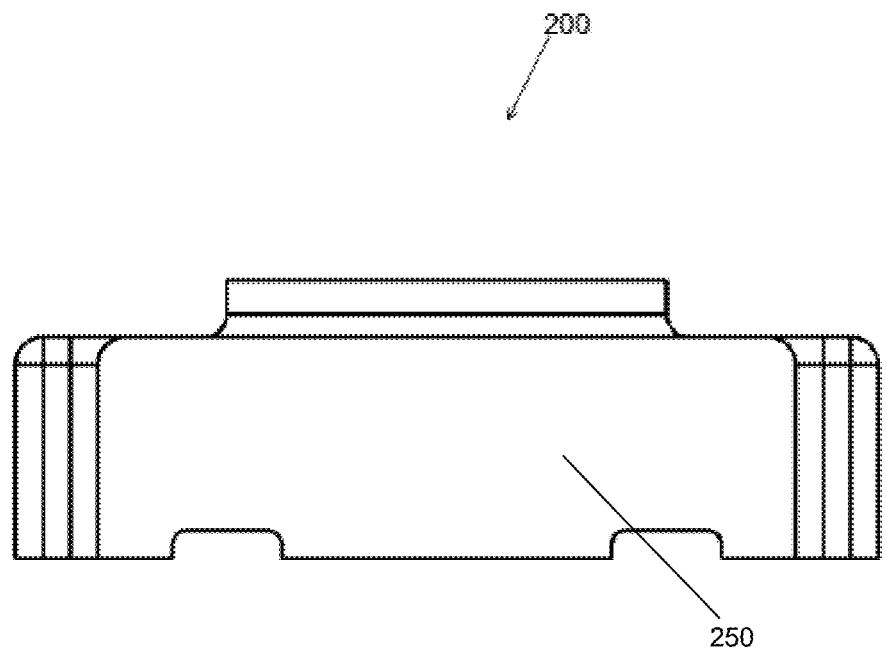
FIG. 3E is a rear side view of the mounting member shown in FIG. 3A.
Figure 3F:
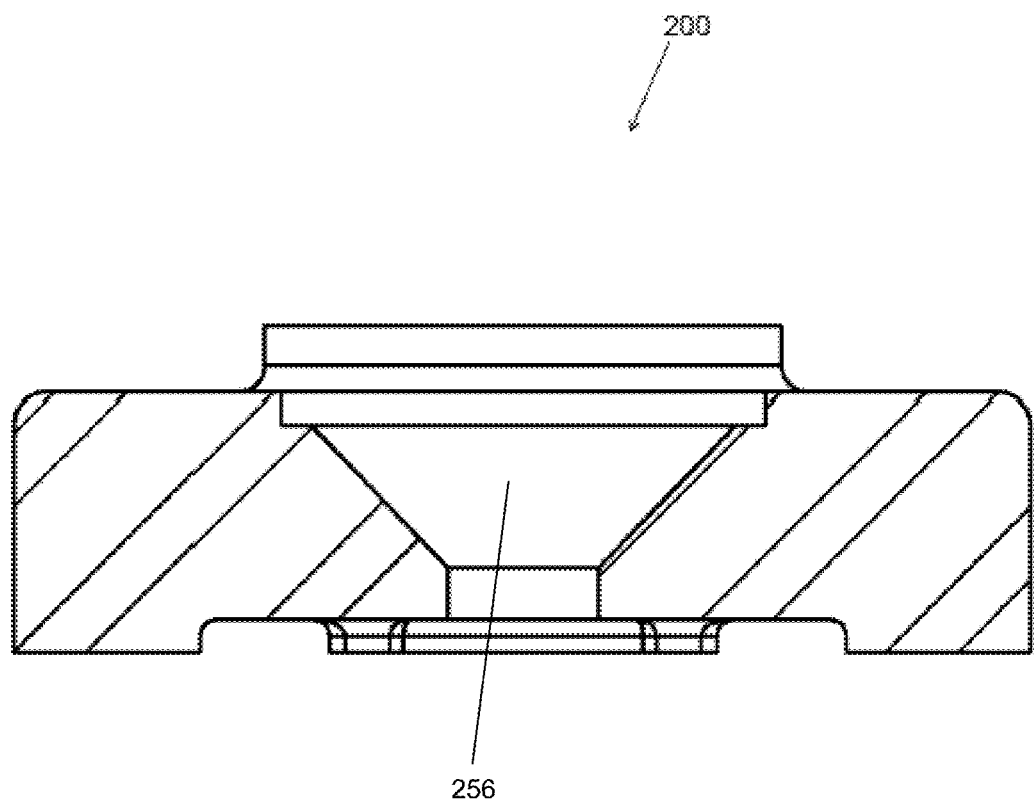
FIG. 3F is a cross-sectional view of the mounting member shown in FIG. 3C, taken about line C-C.
Figure 3G:
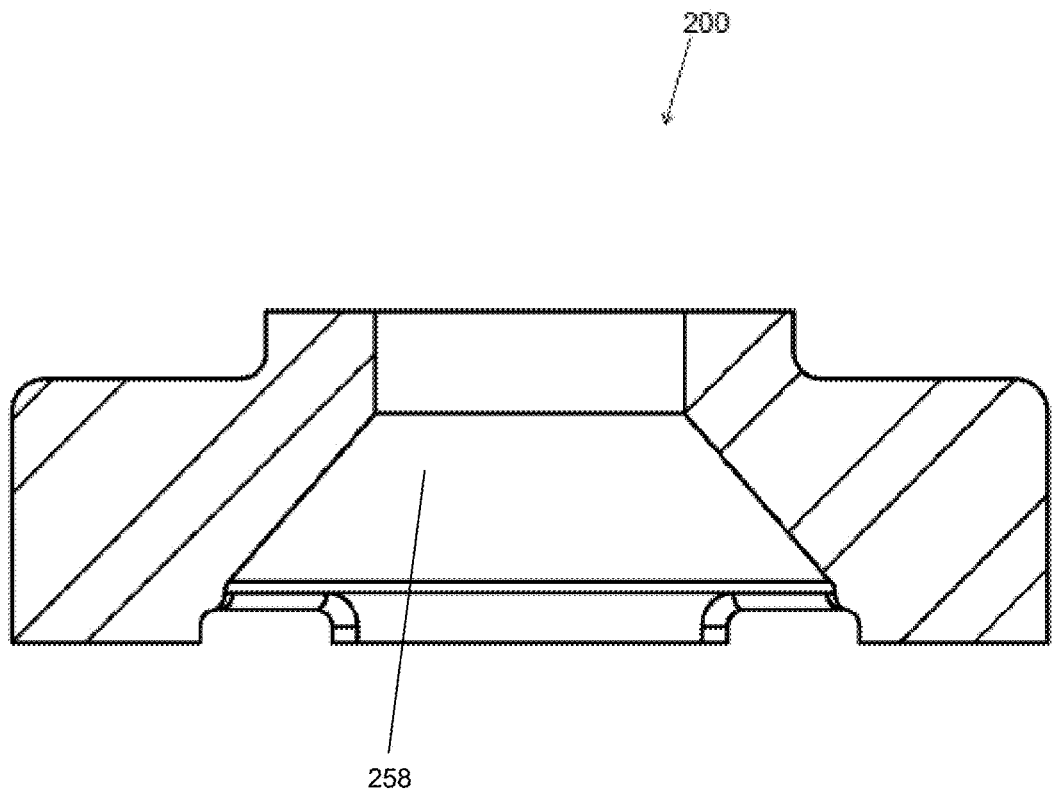
FIG. 3G is a cross-sectional view of the mounting member shown in FIG. 3C, taken about line D-D.

Referring further to FIG. 2d, the divider 210 defines a cavity 220. The cavity 220 can removably receive the mounting member 200 such that the mounting member 200 is contained within the cavity 220. The cavity 220 extends from a side, shown as a bottom side 222, into the divider 210. The bottom side 222 is opposite the first portion 212 and the second portion 214. In an embodiment, the cavity 220 is located proximate the first edge 202. However, in other embodiments, the cavity 220 can be located in other locations relative to the plate 102, such as by being proximate the second edge 204. Because the cavity 220 receives the mounting member 200 and the mounting member 200 facilitates coupling of the solar panel mount 100 to the roof substrate, changing the location of the cavity 220 within the divider 210 allows the solar panel mount 100 to be coupled differently to the roof substrate. As shown in FIGS. 2A-2I, the cavity 220 is closer to the first edge 202 (and thus the flanges 216, 218) than the second edge 204. In some embodiments, such as where the plate 102 is overmolded on the mounting member 200, the mounting member 200 may be secured within the cavity 220.

In some embodiments, the plate 102 defines at least one opening spaced from the first edge 202. In the embodiment depicted in FIGS. 2A-2I, the divider 210 defines a first opening 224 and a second opening 226. The first opening 224 and the second opening 226 are positioned over the cavity 220. For example, the openings 224, 226 may be defined by a surface of the divider 210 which at least partially defines the cavity 220. The first opening 224 can receive a fastener (not shown) to couple the mounting member 200 to the roof substrate. The mounting member 200 includes an aperture, shown as a countersink 228, that can be aligned with the first opening 224. As will be described in more detail herein, the countersink 228 can receive a head of the fastener such that the head of the fastener is substantially flush with, or inset relative to, a top surface of the divider 210. In this way, the solar panel mounting bracket 104 may be mounted flush against the divider 210. In some embodiments, the divider 210 is spaced from the first surface 211. For example, the divider 210 may be raised relative to the first surface 211. As such, the cavity 220 may be defined on an opposite side of the first surface 211 from the at least one opening.

In some embodiments, the mounting member 200 also includes a protrusion, shown as a protrusion 230, which can extend into the second opening 226. The protrusion 230 defines an aperture, shown as an opening 232. The mounting member 200 defines an aperture, shown as a countersink 233, that is aligned with the opening 232. The opening 232 can receive the fastener 106 such that the fastener 106 extends through the mounting member 200 via the opening 232 and can be received through an opening in the solar panel mounting bracket 104. In this way, the fastener 106 couples the mounting member 200, and therefore the plate 102, to the solar panel mounting bracket 104. As will be described in more detail herein, the countersink 233 can receive a head of the fastener 106 such that the head of the fastener 106 is substantially flush with, or inset relative to, a bottom surface of the mounting member 200. The protrusion 230 can extend into the second opening 226 such that the protrusion 230 is substantially flush with, or inset relative to, a top surface of the divider 210. As a result, the solar panel mounting bracket 104 may be mounted flush against the divider 210 and flush against the roof substrate.

Over time, the solar panel mount 100 may be exposed to water. For example, as rain falls onto roof tiles, the rain may be directed across the plate 102 and towards a gutter. The plate 102 defines a plurality of drains 234 positioned along the first edge 202. The drains 234 may be slots, apertures, or other openings. The drains 234 are positioned between the first edge 202 and one of the first flange 216 and the second flange 218. The drains 234 facilitate draining of rain or other fluid from the plate 102, which can increase the structural integrity of the solar panel mount 100. For example, the drains 234 may reduce the likelihood of corrosion of the solar panel mount 100 by reducing the likelihood of water collection on the solar panel mount 100. In the embodiment depicted in FIGS. 2D-2E, three drains 234 are positioned along the first edge 202 adjacent the first flange 216, and three drains 234 are positioned along the first edge 202 adjacent the second flange 218. In some embodiments, the drains 234 abut the divider 210.

Referring now to FIGS. 3A-3G, the mounting member 200 is shown in more detail. The mounting member 200 includes a body 250 including a first surface 252 and a second surface 254 spaced from the first surface 252. When received in the cavity 220 of the plate 102, the first surface 252 is closer to the plate 102 than the second surface 254.

The body 250 defines at least one channel extending through the body 250 from the first surface 252 to the second surface 254. As shown in FIGS. 3A-3G, the body 250 defines a first channel 256 (corresponding to countersink 228 as described above) and a second channel 258 (corresponding to opening 232 as described above). In some embodiments, the first channel 256 decreases in radius from the first surface 252 to the second surface 254, and the second channel 258 increases in radius from the first surface 252 to the second surface 254. In some embodiments, the solar panel mount 100 includes one or more sealing plugs (not shown) to plug first ends of the channels 256, 258 (e.g., ends of the channels 256, 258 adjacent to plate 102) and/or second ends of channels 256, 258 (e.g., ends of the channels 256, 258 adjacent to the roof substrate).

The mounting member 200 may be made of a material suitable for mounting the plate 102 to the roof substrate. For example, the mounting member may be made of a steel alloy, such as 1023 alloy steel.

In some embodiments, the mounting member 200 defines at least one track 260 extending into the second surface 254 and extending along the second surface 254. The at least one track 260 may be overmolded by the plate 102 when the mounting member 200 is received in the cavity 220 of the plate 102.

In some embodiments, the mounting member 200 includes at least one protrusion 264. The at least one protrusion 264 protrudes from the body 250 and extends along a sidewall 262 of the body between the first surface 252 and the second surface 254.

Figure 4:
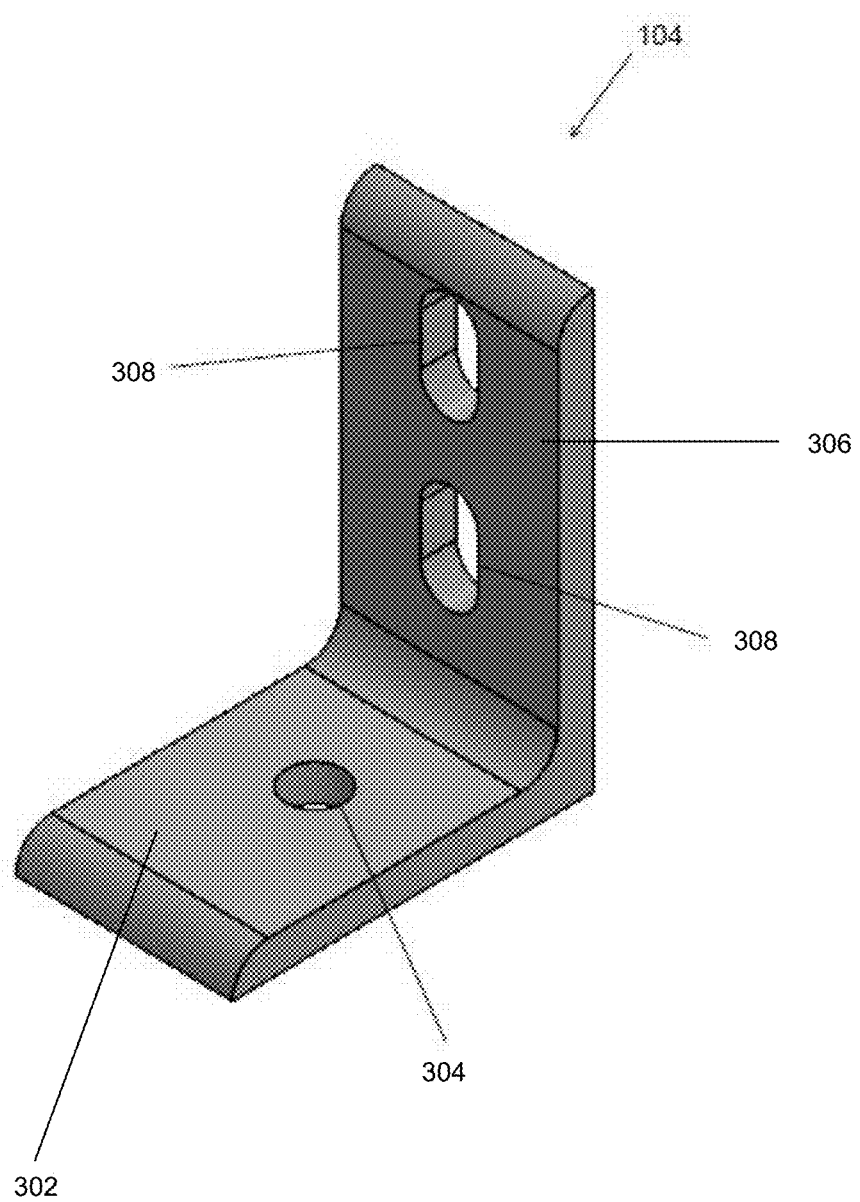
FIG. 4 is a top perspective view of a solar panel mounting bracket for use in a solar panel mount, such as the solar panel mount shown in FIG. 1, according to an exemplary embodiment.

Referring now to FIG. 4, the solar panel mounting bracket 104 is shown in more detail. The solar panel mounting bracket 104 includes a first portion 302 defining a first channel 304. The solar panel mounting bracket 104 also includes a second portion 306 extending from the first portion 302. The second portion 306 can include at least one second channel 308. The solar panel mounting bracket 104 may be corrosion resistant. The solar panel mounting bracket 104 may be made of a high strength aluminum, such as 60601-T6 aluminum.

In some embodiments, the first portion 302 and second portion 306 form an L-shaped bracket; for example, an axis passing through the first channel 304 may be perpendicular to an axis passing through the at least one second channel. The first channel 304 can receive a mounting shaft, such as fastener 106 (see FIG. 1) to fasten the solar panel mounting bracket 104 to the plate 102 and mounting member 200, and thus to the roof substrate when the solar panel mount 100 is installed. In some embodiments, the solar panel mount 100 includes a sealing member (not shown), which can be positioned along or within a boundary between the solar panel mounting bracket 104 and the plate 102 to seal the boundary.

The at least one second channel 308 can receive a fastening member (not shown) to fasten the solar panel mounting bracket 104 to a solar panel assembly (e.g., to rails of a solar panel). Referring back to FIGS. 2A-2I, in embodiments where the plate 102 defines a plurality of openings (e.g., openings 224, 226) and the mounting member 200 defines a plurality of channels (e.g., channels 256, 258), the position of the solar panel mounting bracket 104 relative to the plate 102 can be selectively adjusted by selecting which opening and channel the fastener 106 is received through from the first channel 304.

Figure 5:
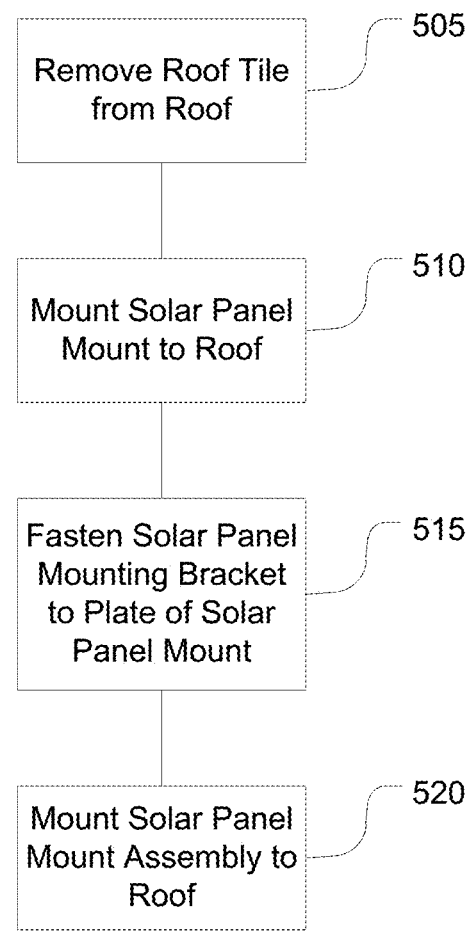
FIG. 5 is a flow diagram of a method of mounting a solar panel mount according to an exemplary embodiment.

Referring now to FIG. 5, a method of installing a solar panel mount is shown according to an embodiment of the present disclosure. The method may be performed using the solar panel mount 100 and the components thereof described with reference to FIGS. 1, 2A-2I, 3A-3G, and 4. The method may be performed by various actors, such as engineers, technicians, roofing specialist, homeowners, contractors, or building owners.

At 505, a roof tile is removed from a roof. The roof tile may be a slate tile. Removing the roof tile may expose a roof substrate. Removing the roof tile may include removing only a single roof tile, such that a portion of the roof substrate corresponding to only the single roof tile is exposed. At 510, a solar panel mount is mounted to the roof substrate adjacent to where the roof tile was removed. Mounting the solar panel mount may including contacting a mounting member of the solar panel mount to the roof substrate. Mounting the solar panel mount may including aligning a plate of the solar panel mount between adjacent roof tiles on the roof substrate. In some embodiments, mounting the solar panel mount to the roof substrate include sliding portions of the plate between adjacent roof tiles and the roof substrate. In some embodiments, the portions of the plate may be slid between adjacent roof tiles until flanges extending from the portions of the plate contact the adjacent roof tiles. At 515, a solar panel mounting bracket is fastened to the plate of the solar panel mount. For example, a fastening member may be used to fasten the solar panel mounting bracket to the plate, and in turn to the mounting member and the roof substrate. In some embodiments, at 520, a solar panel (or an assembly supporting a solar panel) is mounted to the solar panel mounting bracket.

As utilized herein, the terms "approximately," "parallel," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. It is understood that the term "parallel" is intended to encompass de minimis variations as would be understood to be within the scope of the disclosure by those of ordinary skill in the art. Similarly, it is understood that the term "prevent" is intended to encompass de minimis circumvention as would be understood to be within the scope of the disclosure by those of ordinary skill in the art. As utilized herein, the term "adjacent" refers to being near, close, contiguous, adjoining, or neighboring in proximity, thereby including, but not limited to, being reasonably close to or in the vicinity of as well as touching, having a common boundary, or having direct contact.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The terms "joined," "coupled," "fused," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments and that such variations are intended to be encompassed by the present disclosure.

The construction and arrangement of the elements of the solar panel mount, and all other elements and assemblies as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Other substitutions, modifications, changes, and omissions may also be made in the design, operating conditions, and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating configuration, and arrangement of the preferred and other exemplary embodiments without departing from the scope of the appended claims.

What is claimed is:

1. A solar panel mount, comprising:
   a plate including a first surface having a first edge and a second edge opposite the first edge, and a divider extending outward from the first surface starting at the first edge towards the second edge, the divider including at least one first opening spaced from the first edge, the at least one first opening spaced from the first surface, the divider including a cavity on an opposite side of the first surface from the at least one first opening;
   a plurality of flanges extending from the first edge in a direction transverse to the first surface, each flange and the first edge defining at least one respective second opening between the flange and the first edge; and
   a mounting member defining at least one channel aligned with the at least one first opening of the plate to receive a mounting shaft through the cavity and a first opening of the at least one first opening and a corresponding channel of the at least one channel.

2. The solar panel mount of claim 1, wherein the at least one second opening allows water to drain through the at least one second opening.

3. The solar panel mount of claim 1, wherein the mounting member is made of a steel alloy material.

4. The solar panel mount of claim 1, wherein a thickness of a third edge of the plate is greater than 0.02 inches and less than 0.2 inches.

5. The solar panel mount of claim 1, wherein a length of the plate along the first edge is less than 10 inches.

6. The solar panel mount of claim 1, wherein the cavity is closer to the first edge than the second edge.

7. The solar panel mount of claim 1, further comprising a solar panel mounting bracket attached by the mounting shaft to the plate adjacent to the at least one first opening.

8. The solar panel mount of claim 7, further comprising a sealing member to seal a boundary between the solar panel mounting bracket and the plate when the solar panel mounting bracket is attached to the plate.

9. The solar panel mount of claim 1, wherein the plate is made of at least one of a UV stabilized plastic or a plastic including flame retardant additives.

10. The solar panel mount of claim 1, wherein the second edge of the plate has a thickness less than a threshold thickness for sliding the second edge between a roof tile attached to a roof substrate and the roof substrate.

11. The solar panel mount of claim 1, further comprising a sealing plug attached to a first end of the at least one channel of the mounting member opposite a second end adjacent to the plate.

12. A roof mounting assembly, comprising:
    a plate including a first surface having a first edge and a second edge opposite the first edge, and a divider extending outward from the first surface starting at the first edge towards the second edge, the divider defining at least one first opening spaced from the first edge and from the first surface, the divider having a cavity on an opposite side of the first surface from the at least one first opening, the cavity closer to the first edge than the second edge;
    a plurality of flanges extending from the first edge in a direction transverse to the first surface, each flange defining at least one opening between the flange and the first edge; and
    a mounting member defining at least one channel sized to be aligned with the at least one opening of the plate when the mounting member is received in the cavity.

13. The roof mounting assembly of claim 12, wherein a thickness of a third edge of the plate is greater than 0.02 inches and less than 0.2 inches.

14. The roof mounting assembly of claim 12, further comprising a sealing member which seals a boundary between a solar panel mounting bracket and the plate when the solar panel mounting bracket is attached to the plate.

15. The roof mounting assembly of claim 12, wherein the second edge of the plate has a thickness less than a threshold thickness for sliding the second edge between a roof tile attached to a roof substrate and the roof substrate.

\* \* \* \* \*